United States Patent
Ackerman et al.

(10) Patent No.: US 9,959,562 B1
(45) Date of Patent: May 1, 2018

(54) METHOD, MEDIUM, AND SYSTEM FOR LOCAL ITEM FULFILLMENT IN A MARKET HIERARCHY

(71) Applicant: Amazon Technologies, Inc., Reno, NV (US)

(72) Inventors: Neil Scott Ackerman, Bellevue, WA (US); Asanka Boyd Jayasuriya, Toronto (CA); Nicole Andrea Petrich, Seattle, WA (US)

(73) Assignee: Amazon Technologies, Inc., Reno, NV (US)

( * ) Notice: Subject to any disclaimer, the term of this patent is extended or adjusted under 35 U.S.C. 154(b) by 973 days.

(21) Appl. No.: 14/029,355

(22) Filed: Sep. 17, 2013

(51) Int. Cl.
*G06Q 30/00* (2012.01)
*G06Q 30/06* (2012.01)

(52) U.S. Cl.
CPC .............. *G06Q 30/0631* (2013.01)

(58) Field of Classification Search
CPC ........... G06Q 30/0259; G06Q 30/0261; G06Q 30/0639; G06Q 30/0631
USPC ................. 705/14.57, 14.58, 26.9
See application file for complete search history.

(56) References Cited

U.S. PATENT DOCUMENTS

| | | | | |
|---|---|---|---|---|
| 7,945,484 B1* | 5/2011 | Tam | .................. | G06Q 30/06 705/26.1 |
| 2005/0160004 A1* | 7/2005 | Moss | .................. | G06Q 30/00 705/14.35 |
| 2007/0073593 A1* | 3/2007 | Perry | .................. | G06Q 30/02 705/26.64 |
| 2007/0073599 A1* | 3/2007 | Perry | .................. | G06Q 30/02 705/26.5 |
| 2010/0148981 A1* | 6/2010 | Hilliar Isaacson | ............ | G01C 21/3682 340/686.6 |
| 2010/0306080 A1* | 12/2010 | Trandal | .................. | G06Q 10/10 705/26.8 |
| 2011/0191207 A1* | 8/2011 | Schueller | ........... | G06Q 30/0639 705/26.9 |
| 2011/0320318 A1* | 12/2011 | Patel | .................. | G06Q 30/02 705/26.62 |
| 2012/0143720 A1* | 6/2012 | Moser | .................. | G01C 21/362 705/26.8 |
| 2013/0339113 A1* | 12/2013 | Junger | ............... | G06Q 30/0211 705/14.13 |

(Continued)

OTHER PUBLICATIONS

Jan. 2008—http://www.inboundlogistics.com/cms/article/shipping-perishables-without-going-bananas/ (Year: 2008).*

*Primary Examiner* — Matthew E Zimmerman
(74) *Attorney, Agent, or Firm* — Kilpatrick Townsend & Stockton LLP

(57) ABSTRACT

Techniques are provided for managing local item fulfillment. For example, a fulfillment management computer can provide a local item to a user when the local item is stored in a local fulfillment center, when the local fulfillment center can fulfill the order requested by the user quickly, when the price of a local item is within a certain threshold of the best item in a top level market, or when the local item is provided by a preferred item provider. The local item may be a perishable item (e.g., apples) and could benefit from being stored close to a user that orders the local item or be non-perishable (e.g., electronics). It may be preferable to provide an item that is stored locally to the user instead of an item that would need to be shipped to the user from afar.

23 Claims, 9 Drawing Sheets

(56) References Cited

U.S. PATENT DOCUMENTS

2013/0346201 A1\* 12/2013 Bilange .............. G06Q 30/0256
705/14.54
2015/0161704 A1\* 6/2015 Lempel .............. G06Q 30/0629
705/14.53

\* cited by examiner

METHOD, MEDIUM, AND SYSTEM FOR LOCAL ITEM FULFILLMENT IN A MARKET HIERARCHY

BACKGROUND

Items are purchased by millions of users through network content daily, of which a small fraction of these items may be local to the user. These items may be local for many reasons, including because the local items are provided by an item provider that is local to the user, the local items are perishable, or the local items are stored in a local storage facility like a local fulfillment center. For example, if a user purchases a perishable item through a web page, to the user might expect to receive the perishable item quickly, so that the item is delivered to the user while the item is still fresh.

However, managing local item fulfillment on a national scale is difficult, especially when the item fulfillment is managed by a top level market and/or a local market in a market hierarchy. Network content may be provided for top level or local electronic marketplaces with differing delivery times, costs, or regulatory environments. Additionally, it may be difficult to meet each user's desires and expectations with respect to receiving the item. Further, many items that are not local to the user may be difficult to ship within an expedited time frame. Thus, many providers in top level markets may shy away from offering the local items online and only allow the users to purchase the items through brick and mortar stores, like grocery stores. These item providers would lose the profit that they would have gotten from providing these items to users, and users would lose the convenience of ordering these local items through web pages and receiving the items quickly.

BRIEF DESCRIPTION OF THE DRAWINGS

Various embodiments in accordance with the present disclosure will be described with reference to the drawings, in which.

DETAILED DESCRIPTION

Figure 1:
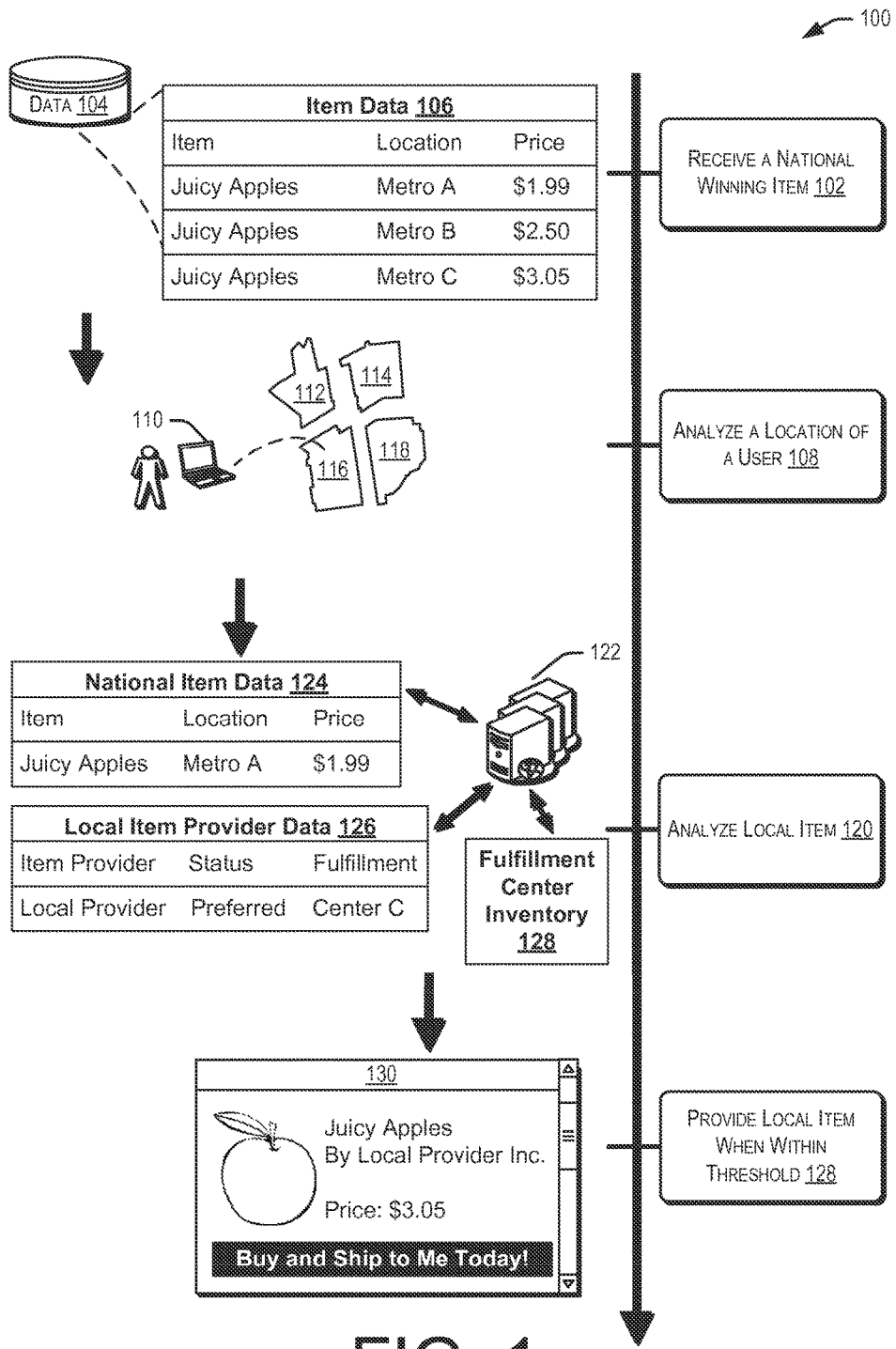
FIG. 1 illustrates an illustrative flow for providing item information for a local item to a user described herein, according to at least one example.

In the following description, various embodiments will be described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiment being described.

Embodiments of the present disclosure are directed to, among other things, a system for providing local items (e.g., providing item information associated with local items) and managing local item fulfillment. For example, a fulfillment management computer can provide a local item to a user when the local item is stored in a local fulfillment center or stored with a local service provider, when the local fulfillment center or service provider can fulfill the order requested by the user quickly, when the price of a local item is within a certain threshold of a best item in a top level market, or when the local item is provided by a preferred item provider. The local item may be a perishable item (e.g., apples) and could benefit from being stored close to a user that orders the local item or be non-perishable (e.g., electronics). In accordance with some embodiments, it may be preferable to provide an item that is stored locally to the user instead of an item that would need to be shipped to the user from afar.

The local item can be associated with a winning item and/or a qualified item. The winning item may be the best item for a particular attribute in some top level market. In a non-limiting example, the winning item may be a particular type of apples (e.g., Juicy Apples) with the best price in a national geography. The attribute in this example would be the price of an item, but the attribute may also describe another characteristic associated with the item and the top level market in this example would be the national geography. In an embodiment, the local item can be associated with a qualified item, which may be one of the best items for a particular attribute in some top level market.

The winning or qualified item may be associated with other geography as well. For example, the winning item can be an item provided to users throughout a top level market in a hierarchy of predetermined markets. Markets can be any geographic area with a boundary, including a global market, a trade region, sub-national regulatory zone, postal or zip code, apartment building, or other sets of geographies. The hierarchy of predetermined markets can be the order that would define one market to be larger than another market. For example, a global market may be a top level market compared to a postal or zip code market, so that the global market as a top level market would be higher than the zip code market in the hierarchy of predetermined markets. In another example, an apartment building may be a top level market compared to an apartment unit, so that the apartment building market may be higher than the apartment unit market in the hierarchy of predetermined markets. In these examples, the global market and the apartment building would be examples of the top level markets in relation to the postal or zip code market and the apartment unit, which would be examples of local markets. Throughout this description, a national market is used as an illustrative example of a top level market and a set of zip codes served by a fulfillment center is used as an illustrative example of a local and/or lower level market. However, as will be appreciated by one of skill in the art, any suitable top level and/or higher level market may be substituted for the national market and any suitable lower level market may be substituted for the local market.

The location of the user can be received or analyzed. In accordance with at least one embodiment, the location of the user can be analyzed in order to determine information that corresponds to the location of the user. For example, a local fulfillment center or local service provider (used interchangeably) can be determined using the location of the user. The local fulfillment center may be assigned to the user, in order to determine which items stored in the local fulfillment center are close to the user. In an embodiment, a local service provider may be assigned to the user, in order to determine which items associated with the local service provider are close to the user. These items may be perishable and non-perishable, so that when the perishable items are shipped to the user, the perishable items can be received by the user while the items are still fresh. The association of the local fulfillment center or service provider to the user may be affected by the geography in a market, including the definition of a top level market (e.g., global, national) or the definition of the local market (e.g., geographic code, city, apartment unit). The location of the user may also be used to determine other information, including which item providers are local to the user.

Information associated with the local fulfillment center or service provider may also be analyzed, including inventory information. For example, the inventory information can include information associated with items that are stored in the local fulfillment center. Inventory information can include price, description, name, item provider, and other information. In another example, the inventory information can be compared with inventory information for other fulfillment centers or item information associated with a winning or qualified item. The comparison with the winning or qualified item may help determine whether the local item should be provided to the user (e.g., to ensure that the price charged by the local merchant is not too expensive compared to what other merchants charge for a similar item).

A local winning or locally qualified item (used interchangeably) may be conditionally chosen and provided to the user. For example, the local winning or locally qualified item may be provided to the user when the local item is stored at the local fulfillment center associated with the user. In another example, the local winning or locally qualified item may be provided to the user when the local item is within a threshold of the national winning item. The threshold may be a limit that the system uses to determine whether to provide the local winning or locally qualified item to the user. For example, the threshold can be based on an attribute associated with the item, like price. The price of the local winning item (e.g., apples) could be $3.05 and the price of the national winning item can be $1.99. When the threshold is 5%, the system may refrain from providing the local winning item to the user when the price of the local winning item is more than 5% of the price of the national winning item. In this example, the local winning item would not be provided to the user because the price of the local winning item exceeds the threshold. In accordance with at least one embodiment, the network content may not display the local winning item and the user would not be able to purchase the item. In another example, the price of the local winning item (e.g., Juicy Apples) could be $2.00 and the price of the national winning item can be $1.99. When the threshold is 5%, the system may provide the local winning item to the user and the user can have the opportunity to order the item. In yet another example, the local winning or locally qualified item may also be the national winning item when the price of the local item is the same price of the national winning item. As used herein, network content may include any electronic content available over a network such as, but not limited to, a web page, an electronic file, an image or video, other media, and/or any other content accessible by one or more computer systems in communication with one another via private and/or public networks.

FIG. 1 illustrates an illustrative flow for providing a local item to a user. In one non-limiting example, the method 100 can receive a national winning item 102. In accordance with at least one embodiment, the method may receive item information for a winning item in a top level market other than a national market without diverting from the scope of the disclosure. The item information may be received from a data store 104 including data tables like an item data table 106. The item data table 106 can contain attribute information associated with one or more items. For example, the item data table 106 can include a description or name of an item (e.g., Juicy Apples), location of where the item is currently stored (e.g., Metro A, Metro B, Metro C), and the price of that item in the particular location (e.g., $1.99, $2.50, $3.05). The data store 104 may also identify a national winning item based on one or more attributes contained in the data store. For example, the national winning item may be Juicy Apples located in Metro A, because the price of these Juicy Apples in this location is only $1.99 whereas the price of the Juicy Apples in Metro B is $2.50 and the price of the Juicy Apples in Metro C is $3.05.

In accordance with at least one embodiment, geographic boundaries may be created. The geographic boundaries may define the geography associated with a merchant and can be created by the method, system, or by a third party. For example, Fulfillment Center A may be located on Main Street in Seattle, Wash. and a geographic boundary can be created around Fulfillment Center A as Metro A, so that each location within the boundary of Metro A can be assigned to Metro A. These locations may be easily accessible by Fulfillment Center A (e.g., within a 60-minute drive-distance by truck). In another example, the geographic boundaries may be created by the U.S. Post Office in the form of postal codes or zip codes. A particular set of codes may be assigned to Fulfillment Center A as Metro A, so that every location associated with these postal codes or zip codes may be located in Metro A. For example, each of the users with a shipping address in zip code 98109 may be associated with Metro A.

In accordance with at least one embodiment, an algorithm or method can correlate geography associated with a fulfillment center based on cost analysis. In accordance with at least one embodiment, the method may limit the cost of delivering an item to a location of the user to a threshold (e.g., $5). The threshold can represent the cost per mile, driver's time, maintenance costs of the delivery vehicles, or other factors that may be considered in delivering an item to a user. For users whose calculated delivery costs are greater than $5, the location of the user may not be associated with a fulfillment center and the user may not be able to receive local items.

One or more markets may be associated with a local fulfillment center. For example, there may be a plurality of markets, including 112, 114, 116, 118, each of which may be associated with a fulfillment center. The location or availability of a local fulfillment center may be affected by the geography associated with the markets, including the definition of a top level market (e.g., global, national) or the definition of the local market (e.g., geographic code, city, apartment unit).

The method may analyze the location of the user 108. For example, once the geographic boundaries have been created by the method, system, or third party, the location of the user can be analyzed and associated with one or more markets or one or more local fulfillment centers. In accordance with at least one embodiment, the location of the user may be determined based on the location of the user when the user browses to the network content, including when the user operates a user device 110 within a particular market 116. In accordance with at least one embodiment, the location of the user may be associated with the location of the user's shipping address, irrelevant to the location of the user device 110 that the user uses to browse to the network content. In an embodiment, the network content can be a web page, content provided via a web page, or a network page.

In accordance with at least one embodiment, a local fulfillment center may be determined with respect to the user from a set of qualified fulfillment centers. The set of qualified fulfillment centers may be at least one fulfillment center available in a top level market that comprises one or more local markets. For example, the method may determine a local fulfillment center to assign to the user when the location of the user is accessible by more than one local fulfillment center. In another example, if the top level market is a state-wide market in Washington, the method may determine a local fulfillment center in Seattle to assign to the user also located in Seattle.

In accordance with at least one embodiment, the top level market and local market may be associated with a different class of delivery. A class of deliver may be the method or time frame associated with the delivery of the item to the location of the user. For example, same-day delivery can be a class of delivery associated with a local market whereas 3- to 5-day delivery may be the class of delivery associated with a top level market. In another example, same-day delivery may be associated with a top level market and 4-hour delivery may be associated with a local market. In yet another example, the class of delivery may be the same for the top level market and the local market.

The user can query the web or network page for network content (e.g., a local item). For example, the user's query can be a search query that contains an alphanumeric string of characters provided to a search engine on a web page that requests information for Juicy Apples.

The system may analyze the local item 120. In accordance with at least one embodiment, the system 122 may analyze information associated with the local item, including inventory information, national or local item information, and item provider information. The local item may be located at a local fulfillment center associated with the user. The information may be stored in a data store 104 and/or one or more data tables, including national item data table 124, local item provider data table 126, and fulfillment center inventory data table 128.

The national item data table 124 can contain information about the national winning item or other qualified items. In accordance with at least one embodiment, the national winning item may be the best item for a particular attribute when compared with other similar items based on the same geography. The winning item may alternatively be a global winning item, a state-wide winning item, or other winning item based on another top level market geography. For example, the national item data table 124 can contain the information about the item "Juicy Apples," the location of the cheapest item in a top level market (e.g., Metro A), and the attribute used to determine that this particular item was the winning item (e.g., price of $1.99).

The local item provider data table 126 can include information about the item provider that provides one or more items. For example, the local item provider data table 126 can include information about the name of the item provider (e.g., Local Provider), the status of the item provider (e.g., Preferred), and the local fulfillment center that the item provider uses to store its items (e.g., Fulfillment Center C). The name of the item provider can be the name that an item provider provides to users. The status of the item provider can be a categorization that the system associates with an item provider. For example, a preferred item provider can be an item provider that has paid money to the system to be associated with the "preferred" title. In another example, the preferred item provider can be an item provider that allows the system to charge higher fees to the item provider. The fees may be associated with sales that the item provider conducts through the use of the system. The system may provide a marketplace of items to users, which can attract more users, and in turn, attract more sales. The preferred item provider can pay a fee to the system for the ability to be listed as a "preferred" item provider in the marketplace and potentially attract more users to the items the provider provides. In yet another example, a preferred item provider may be the highest ranked item provider based on feedback the system received from its users. These examples of preferred item providers are not meant to limit the meaning of the term.

In accordance with at least one embodiment, the item provider may be the only item provider that offers the item to the user. For example, a preferred item provider may offer the local item to the user and the user may not be able to view another local item provided by a different item provider. In another example, a preferred item provider may offer a winning item, or a related item on the same web page as the winning item. The item provider may be identified as a "preferred" item provider.

The fulfillment center inventory data table 128 can contain inventory information for the items that are associated with a fulfillment center. For example, the inventory information associated with a local fulfillment center can include items that are stored in the local fulfillment center, including a local winning or locally qualified item. Inventory information for more than one item may be stored in the fulfillment center inventory data table 128. Additional information associated with inventory information and other data can be found in FIG. 3.

The analyzed local item can be provided to the user 128 when the local item is within a threshold. In accordance with at least one embodiment, the threshold may be associated with an item attribute, so that the price of the local item can be within a certain percentage of the price of the top level winning item. In accordance with at least one embodiment, the threshold may be a threshold distance. The threshold distance may be a distance corresponding to the item, so that the distance of the item to the user can be calculated with respect to any suitable metric (e.g., a Cartesian metric). Using the threshold, the item may be conditionally provided to the user. For example, the local item may be provided to the user when the local item is stored at the local fulfillment center associated with the user. In another example, the local item may be provided to the user when the local item is within a threshold of the national winning item. The local item can be provided to the user via a web page 130 and provide the user with an offer to purchase the local item.

In accordance with at least one embodiment, the local item may not be provided to the user when if the condition is not satisfied. For example, a local item may not be provided to the user when an attribute associated with the item exceeds a threshold (e.g., when the price for the local item is greater than 5% of the national winning item). In response, the web page 130 can respond in a variety of ways, including providing network content, providing other items that are similar to the searched item, responding that no local item is available, or providing other feedback that informs the user that the local item cannot be provided.

In accordance with at least one embodiment, the item may be provided to the user by shipping the item from the local fulfillment center to the user.

Figure 2:
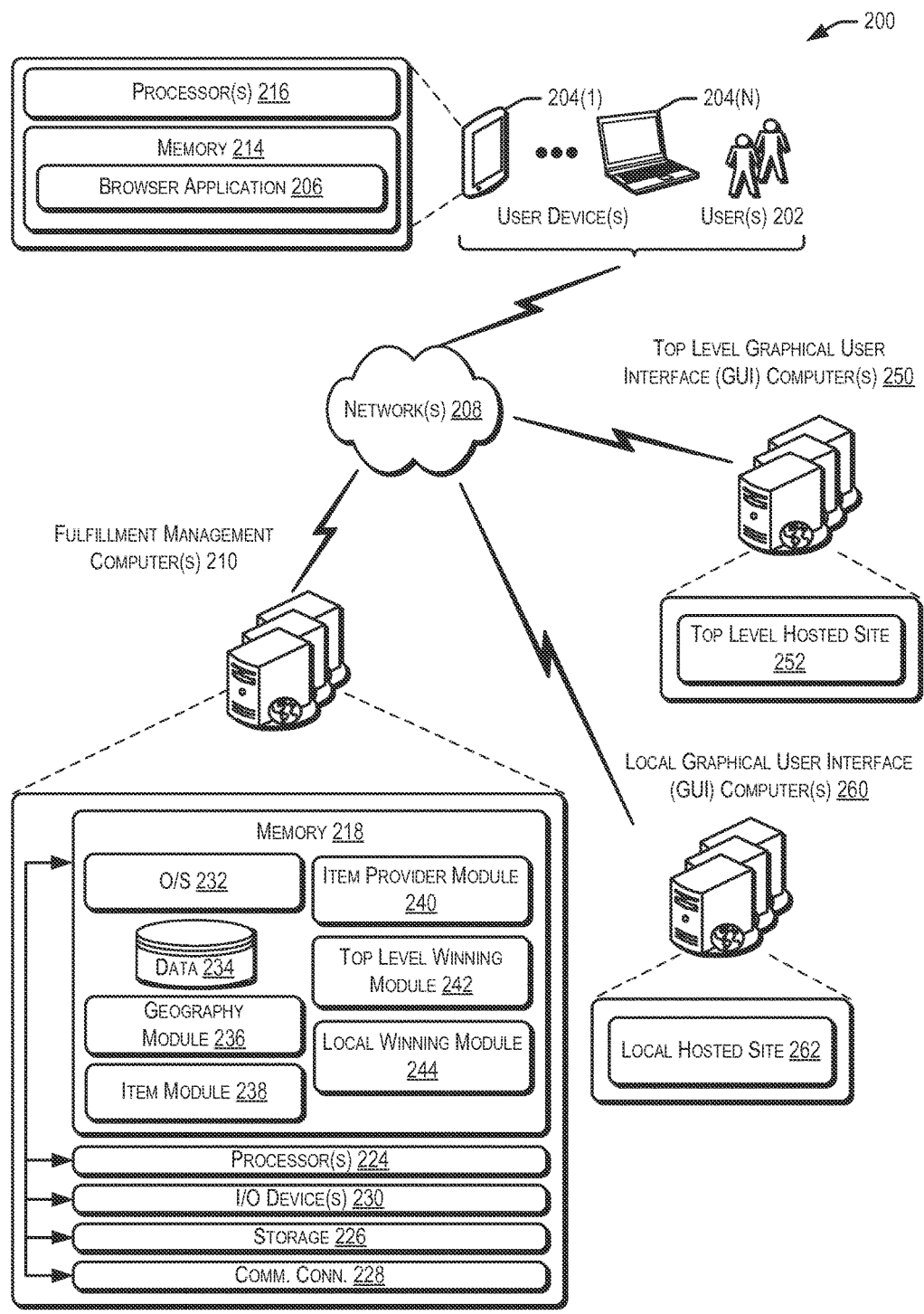
FIG. 2 illustrates an example architecture for implementing fulfillment management described herein that includes one or more fulfillment management systems and/or a user device connected via one or more networks, according to at least one example.

FIG. 2 illustrates an example architecture for implementing fulfillment management described herein that includes one or more fulfillment management systems and/or a user device connected via one or more networks, according to at least one example. In architecture 200, one or more users 202 (e.g., web browser users) may utilize user computing devices 204(1)-(N) (collectively, user devices 204) to access an application 206 (e.g., a web browser), via one or more networks 208. In some aspects, the application 206 may be hosted, managed, and/or provided by a computing resources service or service provider, such as by utilizing one or more fulfillment management computers 210, top level graphical user interface (GUI) computers 250, or local GUI computers 260.

The fulfillment management computers 210 may, in some examples, provide computing resources such as, but not limited to, client entities, low latency data storage, durable data storage, data access, management, virtualization, cloud-based software solutions, electronic content performance management, etc. The fulfillment management computers 210 may also be operable to provide web hosting, computer application development, and/or implementation platforms, combinations of the foregoing, or the like to the one or more users 202. The fulfillment management computers 210, in some examples, may provide electronic fulfillment analysis including, but not limited to, analyzing and/or providing the local items or winning items for one or more geographies.

The user devices 204 may also access one or more computers that provide hosted network content, including a top level geographical user interface (GUI) computer 250 that provides a top level hosted site 252, or a local geographical user interface (GUI) computer 260 that provides a local hosted site 262. The one or more fulfillment management computers 210, top level GUI computer 250, local GUI computer 260 may be part of a distributed system, combined to a single system (not shown), managed as a cluster of servers or as a server farm, or may host the application 206 and/or cloud-based software services. The top level hosted site 252 and local hosted site 262 can be accessed by user devices 204 through the networks 208.

In some examples, the networks 208 may include any one or a combination of many different types of networks, such as cable networks, the Internet, wireless networks, cellular networks and other private and/or public networks. While the illustrated example represents the users 202 accessing the application 206 over the networks 208, the described techniques may equally apply in instances where the users 202 interact with the fulfillment management computers 210 via the one or more user devices 204 over a landline phone, via a kiosk, or in any other manner. It is also noted that the described techniques may apply in other client/server arrangements (e.g., set-top boxes, etc.), as well as in non-client/server arrangements (e.g., locally stored applications, etc.).

As described briefly above, the application 206 may allow the users 202 to interact with a service provider computer, such as to access web content (e.g., web pages, music, video, etc.). The fulfillment management computers 210, perhaps arranged in a cluster of servers or as a server farm, may host the application 206 and/or cloud-based software services. Other server architectures may also be used to host the application 206. The application 206 may be capable of handling requests from many users 202 and serving, in response, various item web pages. The application 206 can provide any type of website that supports user interaction, including social networking sites, online retailers, informational sites, blog sites, search engine sites, news and entertainment sites, and so forth. As discussed above, the described techniques can similarly be implemented outside of the application 206, such as with other applications running on the user devices 204.

The user devices 204 may be any type of computing device such as, but not limited to, a mobile phone, a smart phone, a personal digital assistant (PDA), a laptop computer, a desktop computer, a thin-client device, a tablet PC, an electronic book (e-book) reader, etc. In some examples, the user devices 204 may be in communication with the fulfillment management computers 210 via the networks 208, or via other network connections. Additionally, the user devices 204 may be part of the distributed system managed by, controlled by, or otherwise part of the fulfillment management computers 210 (e.g., a console device integrated with the fulfillment management computers 210).

In one illustrative configuration, the user devices 204 may include at least one memory 214 and one or more processing units (or processor(s)) 216. The processor(s) 216 may be implemented as appropriate in hardware, computer-executable instructions, firmware, or combinations thereof. Computer-executable instruction or firmware implementations of the processor(s) 216 may include computer-executable or machine-executable instructions written in any suitable programming language to perform the various functions described. The user devices 204 may also include geo-location devices (e.g., a global positioning system (GPS) device or the like) for providing and/or recording geographic location information associated with the user devices 204.

The memory 214 may store program instructions that are loadable and executable on the processor(s) 216, as well as data generated during the execution of these programs. Depending on the configuration and type of user device 204, the memory 214 may be volatile (such as random access memory (RAM)) and/or non-volatile (such as read-only memory (ROM), flash memory, etc.). The user device 204 may also include additional removable storage and/or non-removable storage including, but not limited to, magnetic storage, optical disks, and/or tape storage. The disk drives and their associated computer-readable storage media may provide non-volatile storage of computer-readable instructions, data structures, program modules, and other data for the computing devices. In some implementations, the memory 214 may include multiple different types of memory, such as static random access memory (SRAM), dynamic random access memory (DRAM), or ROM.

Turning to the contents of the memory 214 in more detail, the memory 214 may include an operating system and one or more application programs or services for implementing the features disclosed herein including at least the feedback element or item web page, such as via the browser application 206 or dedicated applications (e.g., smart phone applications, tablet applications, etc.). The browser application 206 may be configured to receive, store, and/or display a website or other interface for interacting with the fulfillment management computers 210. Additionally, the memory 214 may store access credentials and/or other user information such as, but not limited to, user IDs, passwords, and/or other user information. In some examples, the user information may include information for authenticating an account access request such as, but not limited to, a device ID, a cookie, an IP address, a location, or the like. In addition, the user information may include a user 202 provided response to a security question or a geographic location obtained by the user device 204.

In some aspects, the fulfillment management computers 210 may also be any type of computing devices such as, but not limited to, a mobile phone, a smart phone, a personal digital assistant (PDA), a laptop computer, a desktop computer, a server computer, a thin-client device, a tablet PC, etc. Additionally, it should be noted that in accordance with some embodiments, the service provider computers are executed by one more virtual machines implemented in a hosted computing environment. The hosted computing environment may include one or more rapidly provisioned and released computing resources, which computing resources may include computing, networking and/or storage devices. A hosted computing environment may also be referred to as a cloud computing environment. In some examples, the fulfillment management computers 210 may be in communication with the user devices 204 and/or other service providers via the networks 208, or via other network connections. The fulfillment management computers 210 may include one or more servers, perhaps arranged in a cluster, as a server farm, or as individual servers not associated with one another. These servers may be configured to implement the content performance management described herein as part of an integrated, distributed computing environment.

In one illustrative configuration, the fulfillment management computers 210 may include at least one memory 218 and one or more processing units (or processor(s)) 224. The processor(s) 224 may be implemented as appropriate in hardware, computer-executable instructions, firmware, or combinations thereof. Computer-executable instruction or firmware implementations of the processor(s) 224 may include computer-executable or machine-executable instructions written in any suitable programming language to perform the various functions described.

The memory 218 may store program instructions that are loadable and executable on the processor(s) 224, as well as data generated during the execution of these programs. Depending on the configuration and type of fulfillment management computers 210, the memory 218 may be volatile (such as RAM) and/or non-volatile (such as ROM, flash memory, etc.). The fulfillment management computers 210 or servers may also include additional storage 226, which may include removable storage and/or non-removable storage. The additional storage 226 may include, but is not limited to, magnetic storage, optical disks and/or tape storage. The disk drives and their associated computer-readable storage media may provide non-volatile storage of computer-readable instructions, data structures, program modules and other data for the computing devices. In some implementations, the memory 218 may include multiple different types of memory, such as SRAM, DRAM, or ROM.

The memory 218, the additional storage 226, both removable and non-removable, are all examples of computer-readable storage media. For example, computer-readable storage media may include volatile or non-volatile, removable or non-removable media implemented in any method or technology for storage of information such as computer-readable instructions, data structures, program modules, or other data. The memory 218 and the additional storage 226 are all examples of computer storage media. Additional types of computer storage media that may be present in the fulfillment management computers 210 may include, but are not limited to, PRAM, SRAM, DRAM, RAM, ROM, EEPROM, flash memory or other memory technology, CD-ROM, DVD or other optical storage, magnetic cassettes, magnetic tape, magnetic disk storage or other magnetic storage devices, or any other medium which can be used to store the desired information and which can be accessed by the fulfillment management computers 210. Combinations of any of the above should also be included within the scope of computer-readable storage media.

Alternatively, computer-readable communication media may include computer-readable instructions, program modules, or other data transmitted within a data signal, such as a carrier wave, or other transmission. However, as used herein, computer-readable storage media does not include computer-readable communication media.

The fulfillment management computers 210 may also contain communications connection(s) 228 that allow the fulfillment management computers 210 to communicate with a stored database, another computing device or server, user terminals and/or other devices on the networks 208. The fulfillment management computers 210 may also include I/O device(s) 230, such as a keyboard, a mouse, a pen, a voice input device, a touch input device, a display, speakers, a printer, etc.

Turning to the contents of the memory 218 in more detail, the memory 218 may include an operating system 232, one or more data stores 234, and/or one or more application programs or services for implementing the features disclosed herein including a geography module 236, an item module 238, an item provider module 240, a top level winning module 242 and a local winning module 244.

In some examples, a geography module 236 may be configured to determine the geography associated with a fulfillment center for the fulfillment management computer 210. Additionally, in some examples, the geography module 236 may be configured to determine or receive a location of the user. Further, in some examples, the geography module may be configured to maintain and/or manage a local fulfillment center associated with the location of the user.

In accordance with at least one embodiment, the geography module 236 may be configured to choose a local fulfillment center for a consumer from a qualified set of fulfillment centers. For example, more than one fulfillment center may be able to provide an item to a user. The geography module 236 may determine which local fulfillment center should be associated with the location of the user from the qualified set of fulfillment centers.

The geography module 236 may be configured to analyze, manage, store, or determine a hierarchy of predetermined markets. For example, the geography module may determine that a global geography comprises more area than a single geographic code (e.g., postal or zip code) geography. The global geography can be associated with a top level market and the geographic code can be associated with a local market. The global geography and geographic code geography may be predetermined markets, so that the hierarchy of these markets lists the global market as the top level market and the geographic code market as the local market. Additional information about the hierarchy of predetermined markets is illustrated with FIG. 5.

The geography module 236 may also be configured to associate a location of the user with the user's shipping address and/or calculate the cost of delivery to a location of the user. In accordance with at least one embodiment, the geography module 236 may be configured to associate a location of the user with the location of the user device that the user operates to access network content that provides items for the user to order. In accordance with at least one embodiment, the location of the user may be accessible by a vehicle that originates from the local fulfillment center on the same-day that the user orders the local winning item. In accordance with at least one embodiment, the geography module 236 may determine whether the local fulfillment center is located within a same-day driving distance from a location of the user.

The memory 218 may also include an item module 238. The item module 238 may be configured to receive item information for a winning item. For example, the winning item may be a national winning item or other top level winning item for a particular geography. The geography may be a top level market chosen from a hierarchy of predetermined markets. The item information can include a description of an item, attributes (e.g., price), item provider in a particular market, and other items that are available by different item providers in different markets.

In accordance with at least one embodiment, the item module 238 may be configured to associate a query from a user with an item in a fulfillment center's inventory. For example, a user can provide a search query through a web page for "apples." The item module 238 may be configured to search through the data store 234 for items associated with the query and identify one or more items that correlate with the search query. In accordance with at least one embodiment, the item found in the data store may be a local item and the local item can be provided to the user via the web page.

In accordance with at least one embodiment, the item module 238 may provide or analyze inventory information. For example, the item module 238 may access the data store 234 to determine the number of Juicy Apples that are available at Fulfillment Center A. In another example, the item module 238 may instruct or manage inventory at a fulfillment center, so that a future expected demand for an item can be met at a particular fulfillment center.

In accordance with at least one embodiment, the item module 238 can provide regulatory information for items, including which items can or will be exported to foreign countries, languages associated with the items, or other relevant item information.

The memory 218 may also include an item provider module 240. The item provider module 240 may be configured to receive, manage, and store information about item providers. For example, the item provider may be associated with a particular title, like a "preferred" item provider. In accordance with at least one embodiment, a preferred item provider may be an item provider that stores at least a portion of its inventory in a local fulfillment center with other item providers. In accordance with at least one embodiment, a preferred item provider may be an item provider that receives a certain amount of positive feedback from users to make the item provider a "preferred" item provider by users.

The memory 218 may also include a top level winning module 242. The top level winning module 242 may be configured to determine a winning or qualified item for a top level market. The winning item may be the best item for an attribute in a particular market. For example, a national winning item can be the item with the best price in a national geography market. In accordance with at least one embodiment, the winning item may be a global winning item, a national winning item, or other item provided in a top level market.

In accordance with at least one embodiment, the top level winning module 242 may be configured to provide the top level winning item through a marketplace on a web page. For example, the marketplace may be a web page that provides a plurality of items to purchase from a plurality of item providers. In another example, the top level winning module 242 can provide network content that includes a top level winning item or top level qualified items. The top level winning item may be provided to users in the top level market.

In accordance with at least one embodiment, the top level winning module 242 may communicate with top level GUI computers 250 to provide the winning item via a top level hosted site 252.

The memory 218 may also include a local winning module 244. The local winning module 244 may be configured to identify a local winning or locally qualified item. Similar to a top level winning item, the local winning item may be the best item for an attribute in a particular geography or market. The locally qualified item may be one of the best items for an attribute in a particular geography or market. The geography or market associated with the local winning or locally qualified item may be comprise less area than the geography associated with the top level winning item. Unlike a top level winning item, the local winning item may be provided to the user when the local winning item is within a threshold of a particular attribute of a top level winning item.

The local winning module 244 may be configured to identify a local winning item as the item with the best attribute in an area associated with a local fulfillment center. In a non-limiting example, this may include the geographic codes (e.g., postal or zip codes) associated with the local fulfillment center, because the geographic codes are within a particular travel time between the location of the user and the local fulfillment center. This may include a 4-hour drive or a 1-hour flight by a vehicle originating by the local fulfillment center. In another example, the local winning module 244 can provide network content that includes a local winning item or local qualified items.

The threshold may be a percentage or absolute value of an attribute, like a price, regulatory correlation, regulatory compliance, localization compliance, or other form of measurement. In accordance with at least one embodiment, the local winning module 244 may be configured to determine that the local item is a local winning item when the local item is within a threshold of an attribute of the top level winning item. In accordance with at least one embodiment, the threshold can be determined by a threshold test that ensures that the local winning item's price is within a percentage of the winning item in the top level market's price. In accordance with at least one embodiment, the threshold can be based on the accessibility of the location of the user by a vehicle form the local fulfillment center.

In accordance with at least one embodiment, the local winning module 244 may be configured to determine a local winning item based on other factors. The other factors may include providing a local winning item only when the item provider is "preferred," providing a local winning item when the inventory for the local winning item is above a certain threshold (e.g., 10 units in Fulfillment Center A), or other factors. In accordance with at least one embodiment, the threshold can confirm a test. For example, the threshold can confirm that the local item's price is close to the winning item's price.

In accordance with at least one embodiment, the local winning module 244 may communicate with local GUI computers 260 to provide the local item via a local hosted site 262.

The top level GUI computers 250 may be configured to provide computing resources (e.g., web hosting, computer application development, implementation platforms) that is customized for a top level market. For example, the top level GUI computers 250 can provide computing resources that are consistent throughout a top level geography. The top level GUI computers 250 may include memory, processors, I/O devices, storage, and/or communication connections (not shown). The top level GUI computers 250 may provide a top level hosted site 252. The top level hosted site 252 can be a marketplace or item web page that displays one or more items for users in various geographies.

The local GUI computers 260 may be configured to provide computing resources (e.g., web hosting, computer application development, implementation platforms) that is customized for a local market. For example, the local GUI computers 260 can provide computing resources that are consistent only in a particular geography, or consistent throughout various geographies with a focus on a particular local geography. The local GUI computers 260 may include memory, processors, I/O devices, storage, and/or communication connections (not shown). The local GUI computers 260 may provide a local hosted site 262. The local hosted site 262 can be an item web page that displays one item for users in a particular local geography.

In accordance with at least one embodiment, the winning or qualified item in a top level market can be provided on a first web page, including a top level hosted site 252, and the local winning item can be provided at a second web page, including a local hosted site 262. In accordance with another embodiment, the winning or qualified item in a top level market can be provided as first network content and the local winning or qualified item can be provided as second network content. The second web page may serve a smaller geographic area than the first web page. For example, the first web page may provide items that are nationally-accessible and the second web page may provide items that are locally-accessible. More than one second web page can be provided, so that each second web page can be associated with a local market.

In accordance with at least one embodiment, a first web page, including a top level hosted site 252, can provide a winning or qualified item. The top level hosted site may be provided by the top level GUI computer 250. The top level hosted site can provide the winning item with other related items that are not winning items, including providing the winning item in a rank that shows the winning item above the other related items (e.g., qualified items).

In accordance with at least one embodiment, the local GUI computers 260 may provide a second web page or second network content, including a second web page provided by a local hosted site 262. The local GUI computer 260 can receive a request for a local item as second network content (e.g., at a second web page) from a user associated with a location of the user. The local item can be associated with the winning item provided by the top level hosted site 252. The local GUI computers 260 may communicate with the fulfillment management computers 210 to analyze the local item. The analysis may confirm that the local item is located in a local fulfillment center and provided by a preferred item provider. The local GUI computers 260 may provide an offer to purchase the local item to the user via the second web page provided by the local hosted site.

A few additional examples of the operations of the fulfillment management computers 210, top level GUI computers 250, and local GUI computers 260 are also described in greater detail below with reference to FIGS. 3-9.

Figure 3:
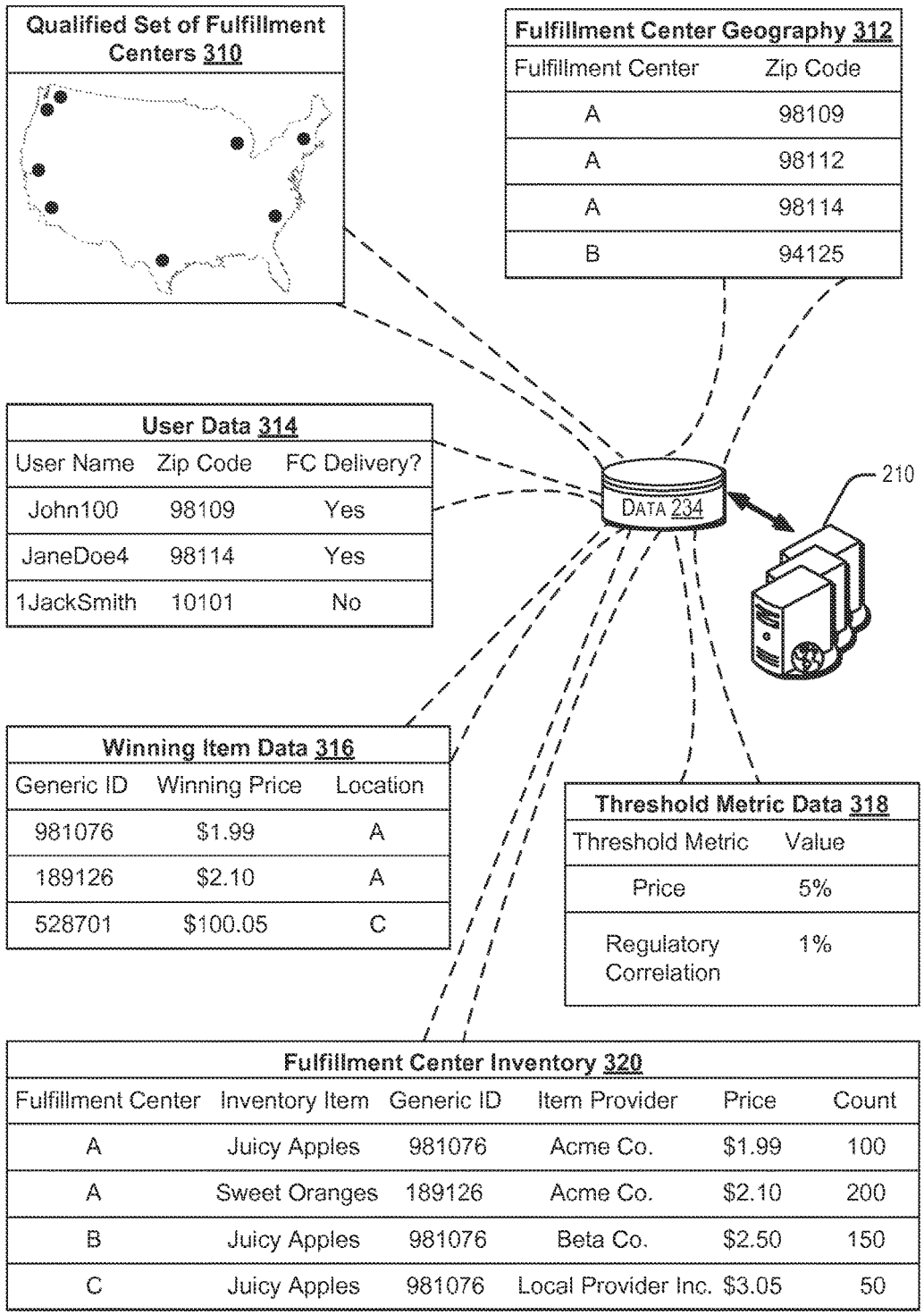
FIG. 3 illustrates a data store associated with the local fulfillment management, according to at least one example.

FIG. 3 illustrates a data store associated with the local fulfillment management, according to at least one example. In a non-limiting example, the data store 234 can comprise several types of data (e.g., in data tables, in object-oriented or relational format) and the data may be accessed by the fulfillment management computers 210. It will be appreciated that data may be dynamically gathered, for example, the data contained in the data store 234 may be dynamically generated and not permanently stored.

The data store 234 may be configured to include one or more qualified set of fulfillment centers data tables 310. The qualified set of fulfillment centers may be a list of one or more locations of fulfillment centers in a geography that can be associated with a location of the user. One or more fulfillment centers may be a local fulfillment center that is associated with a user, from the qualified set of fulfillment centers.

The data store 234 may be configured to include one or more fulfillment center geography data tables 312. The fulfillment center geography can be a list of geographies that are associated with a fulfillment center. For example, when the geographies that are associated with a fulfillment center are zip codes, the fulfillment center (e.g., Fulfillment Center A) may be associated with each zip code assigned to the fulfillment center (e.g., 98109, 98112, 98114). Geography associated with more than one fulfillment center may be stored in the fulfillment center geography data table 312. For example, the geography associated with Fulfillment Center A and Fulfillment Center B may be stored in the fulfillment center geography data table 312.

In accordance with at least one embodiment, the list of geographies can be calculated by any suitable metric. For example, when the list of geographies is based on the distance between the local fulfillment center and a centroid of a particular zip code, the distance can be calculated with respect to any suitable metric (e.g., a Cartesian metric).

The data store 234 may be configured to include one or more user data tables 314. The user data table 314 may include information about one or more users, including a user's user name, a location of the user (e.g., zip code, shipping address), and whether a fulfillment center can deliver to the location of the user. For example, one or more users located in zip codes 98109 or 98114 may be accessible by a fulfillment center (e.g., as seen in the fulfillment center geography data table 312, Fulfillment Center A is associated with these zip codes and can deliver to them). In another example, one or more users in zip code 10101 are not accessible by a fulfillment center. In accordance with at least one embodiment, the user that is not accessible by a fulfillment center may not be provided a local item by the system.

The data store 234 may be configured to include one or more winning item data tables 316. The winning item data can include a list of each winning or qualified item in one or more geographies. In a non-limiting example, when the best price for item Juicy Apples is located in Metro A or located at Fulfillment Center A, the winning item data table 316 may associate the winning item price for Juicy Apples as the winning price for Metro A or Fulfillment Center A.

In accordance with at least one embodiment, one or more attributes may be used to determine a winning or qualified item. For example, as shown in the winning item data table 316, price can be an attribute used to determine that an item is a winning item, because the item is offered for the cheapest price in a market. In accordance with at least one embodiment, an item may be a winning item because it is associated with the best feedback from other users, causing the item to have the highest rating in a market. In accordance with at least one embodiment, the attribute may be a regulatory correlation. For example, the item may be the best item to export to a foreign country based on the laws associated with exporting or importing the item to that country. In another example, the item may be the only available item in the regulatory language of the location of the user.

One or more attributes can be used to determine a winning or qualified item in a market. This may cause more than one similar item to be listed as a winning item in a particular market. For example, one item can have the best price in the market and another item can be associated with the best feedback for an item provider in a market. In accordance with at least one embodiment, both items may be winning or qualified items. In accordance with at least one embodiment, only one item may be considered a winning item.

In accordance with at least one embodiment, each item may be associated with a generic identifier or an item identifier. For example, Juicy Apples may be associated with item generic identifier "981076" and Sweet Oranges may be associated with generic identifier "189126." The generic identifier may be consistent across all markets for the same or similar items. This may facilitate a comparison of similar items in a geography, which can help the system determine whether the local item's attribute is within a threshold of the winning items' attribute.

The data store 234 may be configured to include one or more threshold metric data tables 318. The threshold metric can be the limit that the system uses to determine whether to provide the local winning item to the user, based on the attribute. For example, when an item is provided to a user based on the attribute of "price," the attribute threshold may be 5%. Local items that have a price greater than 5% when compared to the winning item may not be provided to the user. In another example, when an item is provided to a user based on the attribute of "regulatory correlation," the attribute threshold may be 1%. Local items that have a regulatory correlation greater than 1% when compared to the winning item may not be provided to the user.

The data store 234 may be configured to include one or more fulfillment center inventory data tables 320. The fulfillment center inventory can include any items that are associated with or stored at the fulfillment center. For example, Fulfillment Center A may include Juicy Apples, associated with generic identifier 981076, provided by item provider Acme Co., for a price of $1.99. There may be a total count of 100 Juicy Apples available at Fulfillment Center A. In another example, Fulfillment Center A may also include Sweet Oranges, associated with generic identifier 189126, provided by item provider Acme Co., for a price of $2.10, with a total count of 200 Sweet Oranges available at Fulfillment Center A. In yet another example, Fulfillment Center B may include Juicy Apples, associated with generic identifier 981076, provided by item provider Beta Co., for a price of $2.50, with a total count of 150 Juicy Apples available at Fulfillment Center B. In still another example, Fulfillment Center C may include Juicy Apples, associated with generic identifier 981076, provided by item provider Local Provider, for a price of $3.05, with a total count of 50 Juicy Apples available at Fulfillment Center C.

Figure 4:
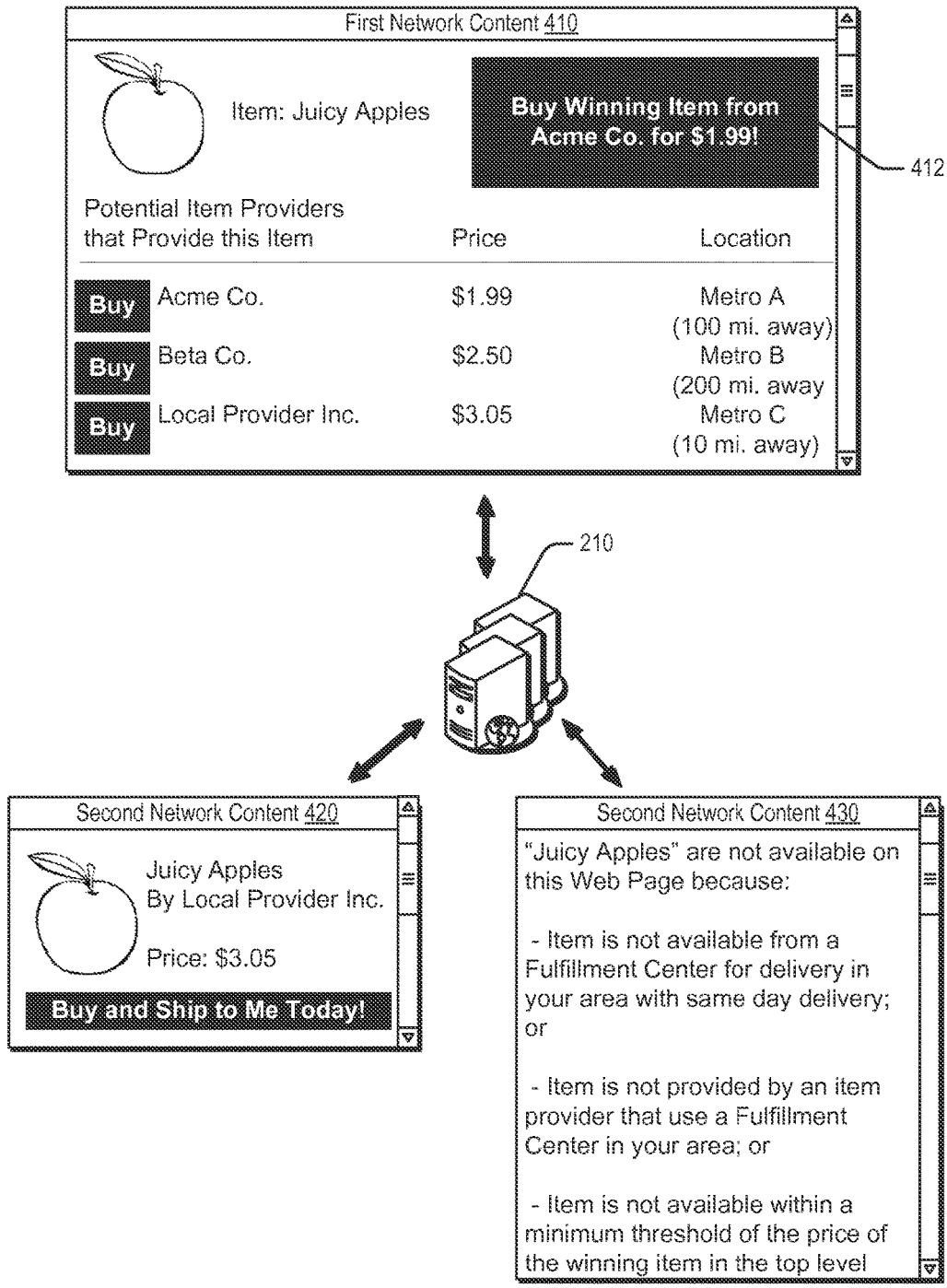
FIG. 4 illustrates first network content for providing a national item and two potential examples of second network content for providing a local item, according to at least one example.

FIG. 4 illustrates first network content for providing a national item and two potential second sources of network content for providing a local item, according to at least one example.

In accordance with at least one embodiment, the fulfillment management computers 210 or top level GUI computers 250 can provide first network content 410 to a user. The network content may be provided as a web page. The first network content can contain information about items, item providers, and/or a winning item. The first network content may provide an offer to purchase the winning item 412, or an offer to purchase any of the items offered with the first network content.

A second network content may also be provided to the user. The fulfillment management computers 210 or local GUI computer 260 may provide the second network content to the user. In an example, the second network content 420 can include a local item when an attribute associated with the local item is within a threshold of the corresponding attribute of the winning or qualified item. The second network content 420 can include an offer to purchase the local item.

In another example, the second network content 430 may not provide the local item. The second network content 430 may not include an offer to purchase the local item for many reasons. In accordance with at least one embodiment, the second network content 430 may include a reason why the local item is not provided to the user. For example, the item may not be available form a fulfillment center for delivery in the area associated with the user, the item may not be available for same-day delivery, the item may not be provided by an item provider that uses a fulfillment center in the user's area, the item may not be available within a minimum threshold of an attribute associated with an attribute for the winning item in the top level market, or other reasons.

In accordance with at least one embodiment, when the attribute associated with the local item is not within a threshold of the corresponding attribute of the winning item, the second network content 430 may not provide an explanation, or provide a similar item to the user than the item requested in the search query.

Figure 5:
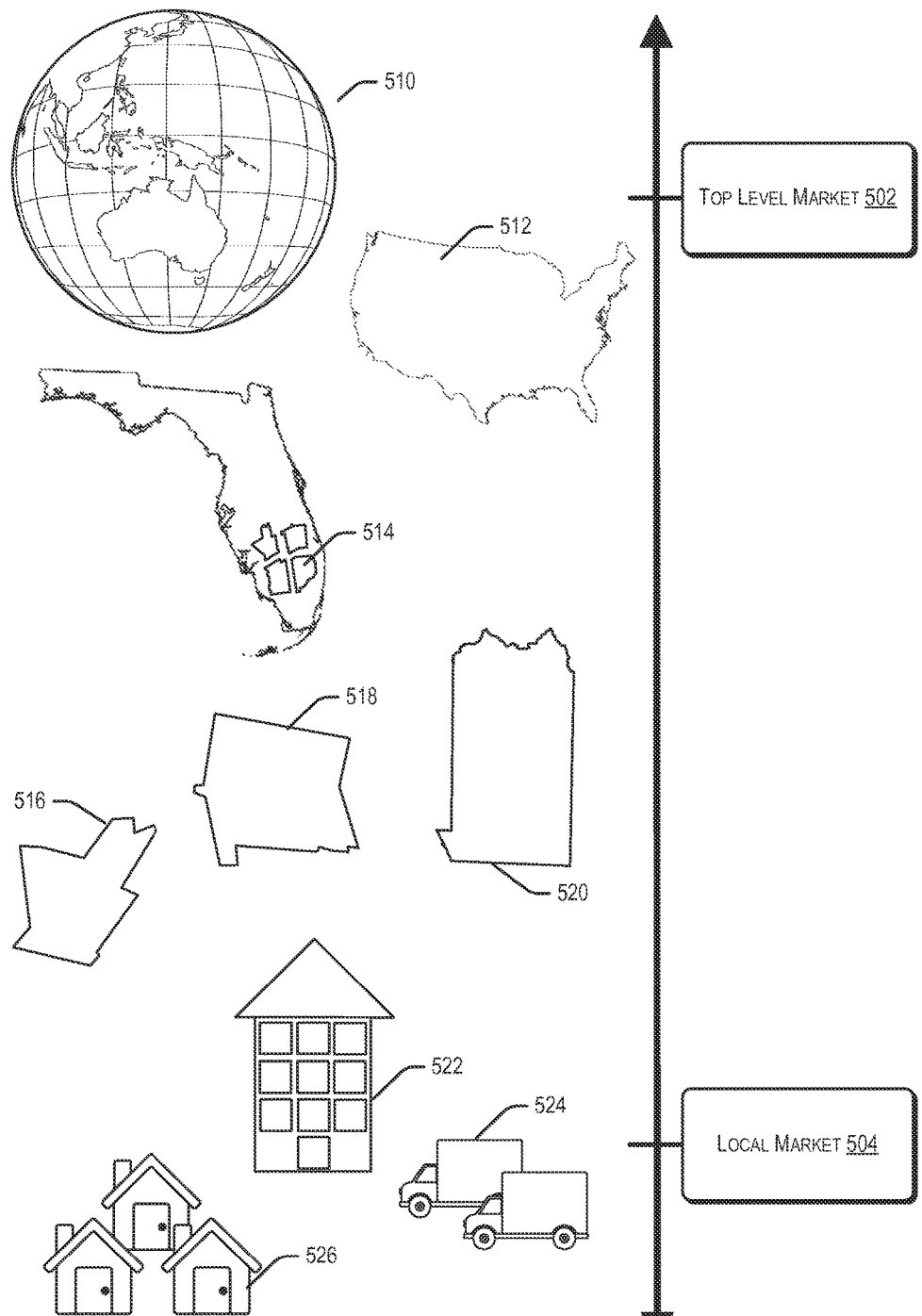
FIG. 5 illustrates an example top level markets and local markets, according to at least one example.

FIG. 5 illustrates top level markets and local markets, according to at least one example. In a non-limiting example, a top level market 502 or a local market 504 can include a global market 510, national market 512, postal or zip code 514, sub-national regulatory zone 516, a trade region 518, state-wide regulatory zone 520, apartment building 522, geographies accessible by travel distance 524, homes or apartments 526, or other sets of geographies. In accordance with at least one embodiment, the top level market 502 may cover more area that the local market 504. In accordance with at least one embodiment, the top level market may be chosen from a hierarchy of predetermined markets.

Figure 6:
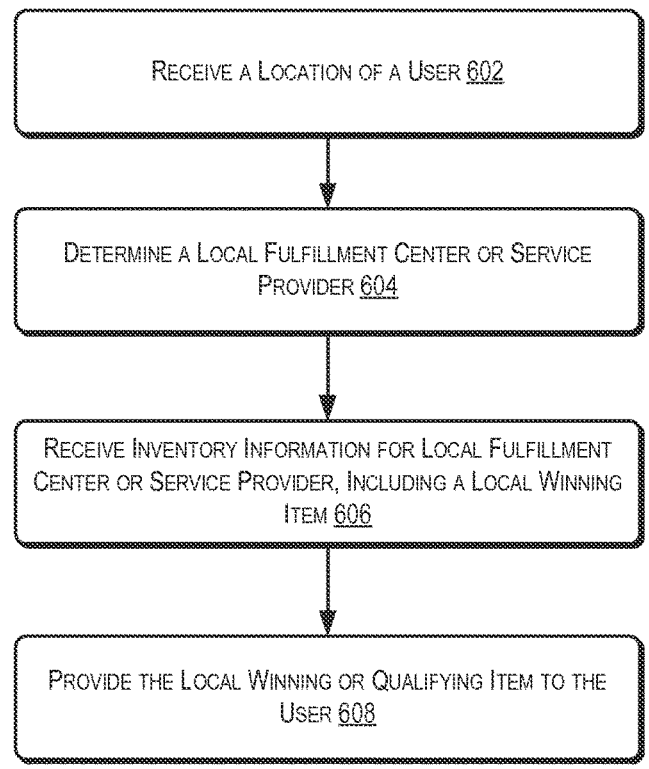
FIG. 6 is a flow diagram illustrating an example process for providing fulfillment management of local items.

FIG. 6 illustrates an example flow diagram of a process 600 for describing implementation of providing a local item described herein, according to at least one example. The one or more fulfillment management computers 210 (e.g., utilizing at least one of the geography module 236, the item module 238, the item provider module 240, the top level winning module 242, and/or the local winning module 244) shown in FIG. 2 may perform the process 600 of FIG. 6. The process 600 may begin at 602 by receiving a location of the user. In accordance with at least one embodiment, item information for a national winning item or other winning item may also be received. At 604, the process 600 may include determining a local fulfillment center. The local fulfillment center may be determined using the location of the user. At 606, the process 600 may include receiving inventory information for the local fulfillment center, including a local winning item. In accordance with at least one embodiment, the process may also include receiving a search query from the user for an item. In accordance with at least one embodiment, the process may identify a local item in the inventory information of the local fulfillment center that corresponds with the search query, and analyze the local item. The analysis may comprise analyzing a first price for the local item and/or analyzing that the local item is stored in the local fulfillment center by a preferred item provider. In accordance with at least one embodiment, the process may include receiving a second price for the national winning item corresponding to the local item, and comparing the first price to the second price to determine a price difference. Further in some examples, the process 600 may end at 608, where the process 600 may include providing the local winning item to the user. In accordance with at least one embodiment, the local winning item may be provided when the price difference or other attribute is within a threshold.

Figure 7:
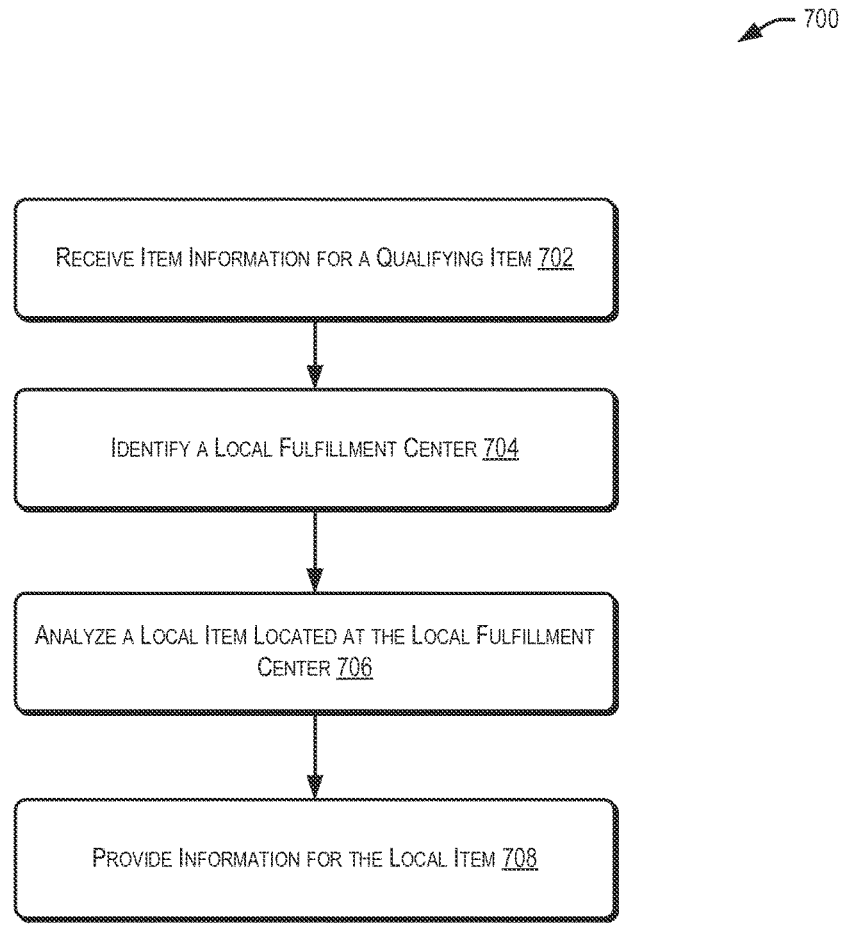
FIG. 7 is a flow diagram illustrating an example process for providing fulfillment management of local items.

FIG. 7 illustrates an example flow diagram of a process 700 for describing implementation of providing a local item described herein, according to at least one example. The one or more fulfillment management computers 210 (e.g., utilizing at least one of the geography module 236, the item module 238, the item provider module 240, the top level winning module 242, and/or the local winning module 244) shown in FIG. 2 may perform the process 700 of FIG. 7. The process 700 may begin at 702 by receiving item information for a qualified item. At 704, the process 700 may include determining a local fulfillment center. In accordance with at least one embodiment, the determination of the local fulfillment center may be with respect to a user, a location of a user, or a set of qualified fulfillment centers. At 706, the process 700 may include analyzing a local item located at the local fulfillment center. Further in some examples, the process 700 may end at 708, where the process 700 may include providing information for the local item. In accordance with at least one embodiment, the information may be provided when an attribute associated with the local item is within a threshold distance of a corresponding attribute. The attribute may be associated with a local item and the corresponding attribute may be associated with the winning item.

Figure 8:
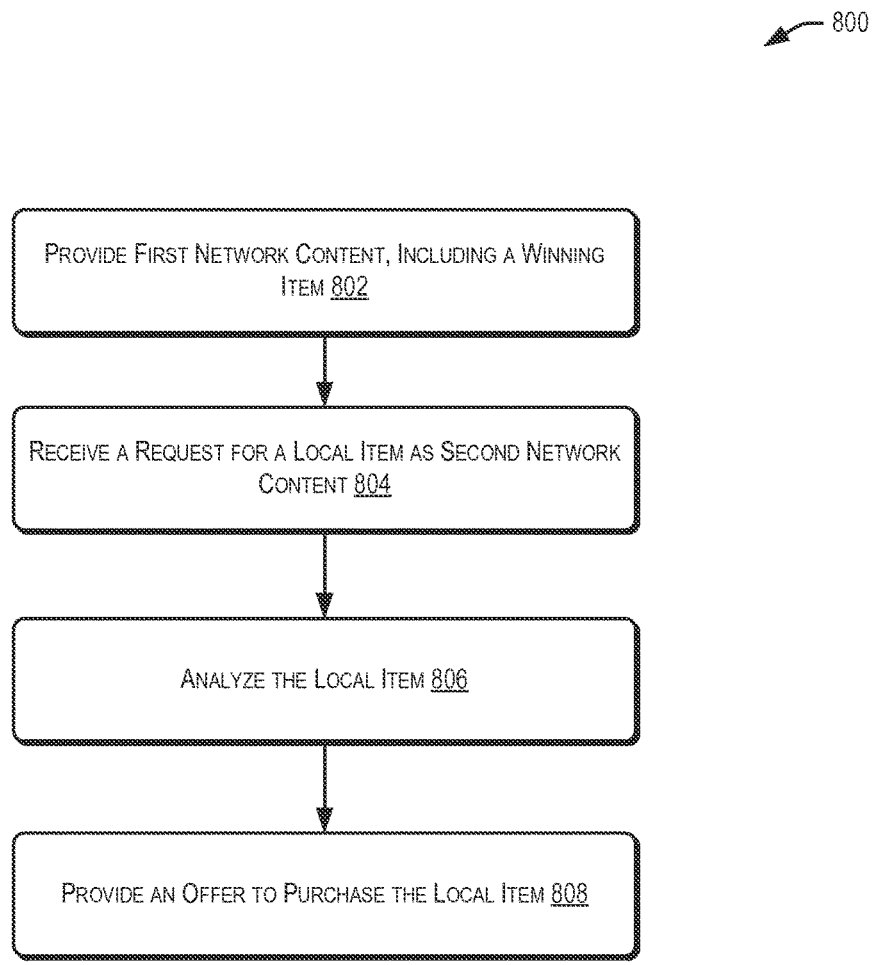
FIG. 8 is a flow diagram illustrating an example process for providing fulfillment management of local items.

FIG. 8 illustrates an example flow diagram of a process 800 for describing implementation of providing a local item described herein, according to at least one example. The one or more fulfillment management computers 210 (e.g., utilizing at least one of the geography module 236, the item module 238, the item provider module 240, the top level winning module 242, and/or the local winning module 244) shown in FIG. 2 may perform the process 800 of FIG. 8. The process 800 may begin at 802 by providing first network content or a first web page, including a winning item. At 804, the process 800 may include receiving a request for a local item as second network content (e.g., at a second web page). In accordance with at least one embodiment, the request may be received from a user associated with a location of the user. At 806, the process 800 may include analyzing the local item. In accordance with at least one embodiment, the analysis may include confirmation that the local item is located in a local fulfillment center and provided by a preferred item provider. Further in some examples, the process 800 may end at 808, where the process 800 may include providing an offer to purchase the local item. In accordance with at least one embodiment, the offer is provided when an attribute associated with the local item is within a threshold distance of a corresponding attribute of the winning item.

Illustrative methods and systems for managing lost sales feedback are described above. Some or all of these systems and methods may, but need not, be implemented at least partially by architectures such as those shown at least in FIGS. 1-8 above.

Figure 9:
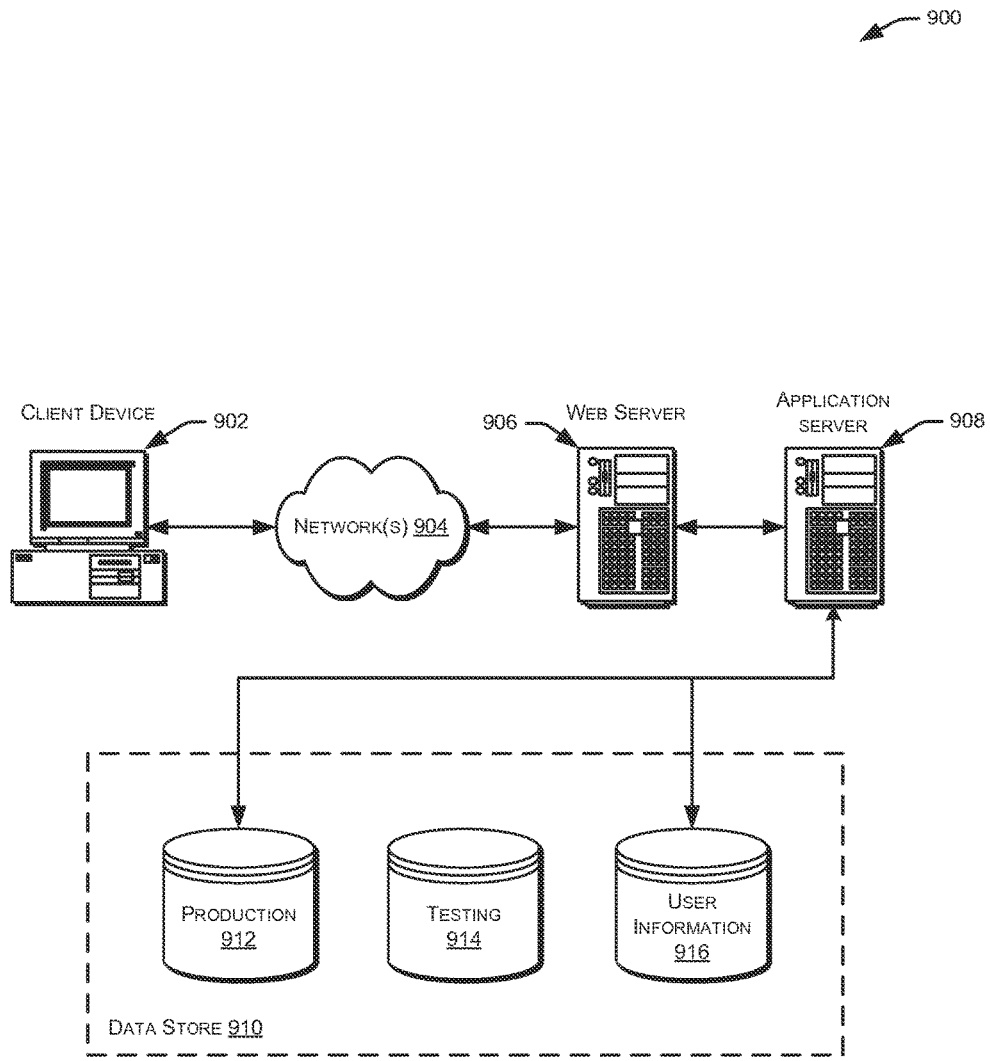
FIG. 9 illustrates an environment in which various embodiments of the management of local item fulfillment can be implemented, according to at least one example.

FIG. 9 illustrates aspects of an example environment 900 for implementing aspects in accordance with various embodiments. As will be appreciated, although a Web-based environment is used for purposes of explanation, different environments may be used, as appropriate, to implement various embodiments. The environment includes an electronic client device 902, which can include any appropriate device operable to send and receive requests, messages, or information over an appropriate network 904 and convey information back to a user of the device. Examples of such client devices include personal computers, cell phones, handheld messaging devices, laptop computers, set-top boxes, personal data assistants, electronic book readers, and the like. The network can include any appropriate network, including an intranet, the Internet, a cellular network, a local area network or any other such network or combination thereof. Components used for such a system can depend at least in part upon the type of network and/or environment selected. Protocols and components for communicating via such a network are well known and will not be discussed herein in detail. Communication over the network can be enabled by wired or wireless connections and combinations thereof. In this example, the network includes the Internet, as the environment includes a Web server 906 for receiving requests and serving content in response thereto, although for other networks an alternative device serving a similar purpose could be used as would be apparent to one of ordinary skill in the art.

The illustrative environment includes at least one application server 908 and a data store 910. It should be understood that there can be several application servers, layers, or other elements, processes or components, which may be chained or otherwise configured, which can interact to perform tasks such as obtaining data from an appropriate data store. As used herein the term "data store" refers to any device or combination of devices capable of storing, accessing, and/or retrieving data, which may include any combination and number of data servers, databases, data storage devices and data storage media, in any standard, distributed or clustered environment. The application server can include any appropriate hardware and software for integrating with the data store as needed to execute aspects of one or more applications for the client device, handling a majority of the data access and business logic for an application. The application server provides access control services in cooperation with the data store, and is able to generate content such as text, graphics, audio and/or video to be transferred to the user, which may be served to the user by the Web server in the form of HTML, XML or another appropriate structured language in this example. The handling of all requests and responses, as well as the delivery of content between the client device 902 and the application server 908, can be handled by the Web server. It should be understood that the Web and application servers are not required and are merely example components, as structured code discussed herein can be executed on any appropriate device or host machine as discussed elsewhere herein.

The data store 910 can include several separate data tables, databases or other data storage mechanisms and media for storing data relating to a particular aspect. For example, the data store illustrated includes mechanisms for storing production data 912 and user information 916, which can be used to serve content for the production side. The data store also is shown to include a mechanism for storing log data 914, which can be used for reporting, analysis, or other such purposes. It should be understood that there can be many other aspects that may need to be stored in the data store, such as for page image information and to access right information, which can be stored in any of the above listed mechanisms as appropriate or in additional mechanisms in the data store 910. The data store 910 is operable, through logic associated therewith, to receive instructions from the application server 908 and obtain, update or otherwise process data in response thereto. In one example, a user might submit a search request for a certain type of item. In this case, the data store might access the user information to verify the identity of the user, and can access the catalog detail information to obtain information about items of that type. The information then can be returned to the user, such as in a results listing on a web page that the user is able to view via a browser on the user device 902. Information for a particular item of interest can be viewed in a dedicated page or window of the browser.

Each server typically will include an operating system that provides executable program instructions for the general administration and operation of that server, and typically will include a computer-readable storage medium (e.g., a hard disk, random access memory, read only memory, etc.) storing instructions that, when executed by a processor of the server, allow the server to perform its intended functions. Suitable implementations for the operating system and general functionality of the servers are known or commercially available, and are readily implemented by persons having ordinary skill in the art, particularly in light of the disclosure herein.

The environment in accordance with at least one embodiment is a distributed computing environment utilizing several computer systems and components that are interconnected via communication links, using one or more computer networks or direct connections. However, it will be appreciated by those of ordinary skill in the art that such a system could operate equally well in a system having fewer or a greater number of components than are illustrated in FIG. 9. Thus, the depiction of the system 900 in FIG. 9 should be taken as being illustrative in nature, and not limiting to the scope of the disclosure.

The various embodiments further can be implemented in a wide variety of operating environments, which in some cases can include one or more user computers, computing devices or processing devices which can be used to operate any of a number of applications. User or client devices can include any of a number of general purpose personal computers, such as desktop or laptop computers running a standard operating system, as well as cellular, wireless and handheld devices running mobile software and capable of supporting a number of networking and messaging protocols. Such a system also can include a number of workstations running any of a variety of commercially-available operating systems and other known applications for purposes such as development and database management. These devices also can include other electronic devices, such as dummy terminals, thin-clients, gaming systems and other devices capable of communicating via a network.

Most embodiments utilize at least one network that would be familiar to those skilled in the art for supporting communications using any of a variety of commercially-available protocols, such as TCP/IP, OSI, FTP, UPnP, NFS, CIFS, and AppleTalk. The network can be, for example, a local area network, a wide-area network, a virtual private network, the Internet, an intranet, an extranet, a public switched telephone network, an infrared network, a wireless network, and any combination thereof.

In embodiments utilizing a Web server, the Web server can run any of a variety of server or mid-tier applications, including HTTP servers, FTP servers, CGI servers, data servers, Java servers, and business application servers. The server(s) also may be capable of executing programs or scripts in response requests from user devices, such as by executing one or more Web applications that may be implemented as one or more scripts or programs written in any programming language, such as Java®, C, C# or C++, or any scripting language, such as Perl, Python or TCL, as well as combinations thereof. The server(s) may also include database servers, including without limitation those commercially available from Oracle®, Microsoft®, Sybase®, and IBM®.

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network (SAN) familiar to those skilled in the art. Similarly, any necessary files for performing the functions attributed to the computers, servers or other network devices may be stored locally and/or remotely, as appropriate. Where a system includes computerized devices, each such device can include hardware elements that may be electrically coupled via a bus, the elements including, for example, at least one central processing unit (CPU), at least one input device (e.g., a mouse, keyboard, controller, touch screen or keypad), and at least one output device (e.g., a display device, printer or speaker). Such a system may also include one or more storage devices, such as disk drives, optical storage devices, and solid-state storage devices such as RAM or ROM, as well as removable media devices, memory cards, flash cards, etc.

Such devices also can include a computer-readable storage media reader, a communications device (e.g., a modem, a network card (wireless or wired), an infrared communication device, etc.) and working memory as described above. The computer-readable storage media reader can be connected with, or configured to receive, a computer-readable storage medium, representing remote, local, fixed, and/or removable storage devices as well as storage media for temporarily and/or more permanently containing, storing, transmitting, and retrieving computer-readable information. The system and various devices also typically will include a number of software applications, modules, services or other elements located within at least one working memory device, including an operating system and application programs, such as a client application or Web browser. It should be appreciated that alternate embodiments may have numerous variations from that described above. For example, customized hardware might also be used and/or particular elements might be implemented in hardware, software (including portable software, such as applets) or both. Further, connection to other computing devices such as network input/output devices may be employed.

Storage media and computer-readable storage media for containing code, or portions of code, can include any appropriate media known or used in the art, including storage media and communication media, such as but not limited to volatile and non-volatile, removable and non-removable media implemented in any method or technology for storage and/or transmission of information such as computer-readable instructions, data structures, program modules or other data, including RAM, ROM, EEPROM, flash memory or other memory technology, CD-ROM, DVD, or other optical storage, magnetic cassettes, magnetic tape, magnetic disk storage or other magnetic storage devices or any other medium which can be used to store the desired information and which can be accessed by the a system device. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the invention as set forth in the claims.

Other variations are within the spirit of the present disclosure. Thus, while the disclosed techniques are susceptible to various modifications and alternative constructions, certain illustrated embodiments thereof are shown in the drawings and have been described above in detail. It should be understood, however, that there is no intention to limit the invention to the specific form or forms disclosed, but on the contrary, the intention is to cover all modifications, alternative constructions and equivalents falling within the spirit and scope of the invention, as defined in the appended claims.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. The terms "comprising," "having," "including," and "containing" are to be construed as open-ended terms (e.g., meaning "including, but not limited to,") unless otherwise noted. The term "connected" is to be construed as partly or wholly contained within, attached to, or joined together, even if there is something intervening. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate embodiments of the invention and does not pose a limitation on the scope of the invention unless otherwise claimed. No language in the specification should be construed as indicating any non-claimed element as essential to the practice of the invention.

Disjunctive language such as that included in the phrase "at least one of X, Y, or Z," unless specifically stated otherwise, is otherwise understood within the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, and/or at least one of Z in order for each to be present.

Preferred embodiments of this disclosure are described herein, including the best mode known to the inventors for carrying out the invention. Variations of those preferred embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

All references, including publications, patent applications, and patents, cited herein are hereby incorporated by reference to the same extent as if each reference were individually and specifically indicated to be incorporated by reference and were set forth in its entirety herein.

What is claimed is:

1. A computer-implemented method for providing a local item to a user, comprising:
   determining a qualified item corresponding with a top level market, the qualified item corresponding with a top level market price and a top level market location, the qualified item being perishable, the qualified item being able to be provided to users within a limited geography range of the top level market, and the top level market being larger than local geography;
   receiving a location of the user;
   determining, by one or more computer systems configured with computer-executable instructions, a local fulfillment center using the location of the user, the location of the user being accessible by a vehicle that originates from the local fulfillment center on a same day that the user initiates an order for a first local item or a second local item stored with the local fulfillment center, the local fulfillment center serving the local geography, the first local item corresponding with a first item price and the second local item corresponding with a second item price, and the first local item and the second local item being perishable;
   receiving a search query from the user for the qualified item;
   comparing the location of the user with the top level market location;
   preventing a display of the qualified item for the user when the location of the user is outside the limited geography range;
   comparing the first item price and the second item price with the top level market price to determine a price difference;
   determining that the price difference is within a threshold amount for the first local item, but not the second local item;
   preventing the display of the second local item for the user when the second item price is outside the threshold amount;
   and
   providing only the first local item to the user based at least in part the user being outside the limited geography range of the qualified item and the second item price being outside the threshold amount of the top level market price.

2. The computer-implemented method of claim 1, wherein the local fulfillment center is chosen from a qualified set of fulfillment centers.

3. The computer-implemented method of claim 1, wherein the location of the user corresponds to a shipping address of the user.

4. The computer-implemented method of claim 1, wherein the search query for the qualified item is received from the user via a web page, and wherein information about the first local item is provided to the user via the web page.

5. A computer-implemented method for providing a local item to a user, comprising:
- determining a qualified item in a top level market in a hierarchy of predetermined markets, the qualified item in the top level market corresponding with a top level market price and a top level market location, the qualified item being perishable, the qualified item being able to be provided to users within a limited geography range of the top level market, and the limited geography range of the top level market being larger than a local geography;
- receiving a location of the user;
- determining, by one or more computer systems configured with computer-executable instructions, a local service provider using the location of the user, the location of the user being accessible by a vehicle that originates from the local service provider on a same day that the user initiates an order for a first locally qualified item or a second locally qualified item stored with the local service provider, the local service provider serving the local geography, the first locally qualified item corresponding with a first item price and the second locally qualified item corresponding with a second item price, and the first locally qualified item and the second locally qualified item being perishable;
- receiving a search query from the user for the qualified item in the top level market;
- comparing the location of the user with the top level market location;
- preventing a display of the qualified item in the top level market for the user when the location of the user is outside the limited geography range;
- comparing the first item price and the second item price with the top level market price to determine a price difference;
- determining that the price difference is within a threshold amount for the first locally qualified item, but not the second locally qualified item;
- preventing the display of the second locally qualified item for the user when the second item price is outside the threshold amount; and
- providing the first locally qualified item to the user, and not the qualified item or the second locally qualified item, based at least in part the user being outside the limited geography range of the qualified item in the top level market and the second locally qualified item being outside the threshold amount of the qualified item in the top level market.

6. The computer-implemented method of claim 5, wherein the first locally qualified item is provided by an item provider that is preferred, and wherein the item provider is preferred when at least a portion of the item provider's inventory is stored with the local service provider with other item providers.

7. The computer-implemented method of claim 5, wherein the local service provider is determined based on a geographic code associated with the location of the user.

8. The computer-implemented method of claim 5, wherein the item information for the qualified item in the top level market is provided as first network content, and wherein the first locally qualified item is provided as second network content.

9. The computer-implemented method of claim 8, wherein the second network content is associated with a smaller geographic area than the first network content.

10. The computer-implemented method of claim 5, wherein use of the threshold amount ensures that the first item price is within a percentage of the qualified item in the top level market price.

11. The computer-implemented method of claim 5, wherein the threshold amount is based on an accessibility of the location of the user by the vehicle with respect to the local service provider.

12. The computer-implemented method of claim 5, wherein the qualified item in the top level market is provided through a marketplace on a web page.

13. The computer-implemented method of claim 5, wherein the location of the user is accessible by the vehicle that originates from the local service provider on the same day that the user orders the first locally qualified item to maintain freshness of the first locally qualified item.

14. One or more non-transitory computer-readable storage media collectively storing computer-executable instructions that, when executed by one or more computer systems, configure the one or more computer systems to collectively perform operations comprising:
- determining a qualified item, the qualified item corresponding with a top level market price and a top level market location, the qualified item being perishable, the qualified item being able to be provided to users within a limited geography range of the top level market, and the limited geography of the top level market being larger than local geography;
- receiving a location of a user;
- identifying a local fulfillment center with respect to a user from a set of qualified fulfillment centers, the user being accessible by a vehicle that originates from the local fulfillment center on a same day that the user initiates an order for a first local item or a second local item stored with the local fulfillment center, the local fulfillment center serving the local geography, the first locally qualified item corresponding with a first item price and the second locally qualified item corresponding with a second item price, and the first locally qualified item and the second locally qualified item being perishable;
- receiving a search query from the user for the qualified item;
- comparing the location of the user with the top level market location;
- preventing a display of the qualified item for the user when the location of the user is outside the limited geography range;
- comparing the first item price and the second item price with the top level market price to determine a price difference;
- determining that the price difference is within a threshold amount for the first locally qualified item, but not the second locally qualified item;
- preventing the display of the second locally qualified item for the user when the second item price is outside the threshold amount; and
- providing the first locally qualified item to the user, and not the qualified item or the second locally qualified item, based at least in part the user being outside the limited geography range of the qualified item and the second item price being outside the threshold amount of the top level market price.

15. The one or more non-transitory computer-readable storage media of claim 14, wherein the qualified item is a global winning item.

16. The one or more non-transitory computer-readable storage media of claim 14, wherein the qualified item is a national winning item.

17. A system for identifying a locally qualified item, comprising:
  a memory that stores computer-executable instructions; and
  a processor configured to access the memory and to execute the computer-executable instructions to collectively at least:
    determine a winning item, the winning item corresponding with a winning price and a top level market location, the winning item being perishable, the winning item being able to be provided to users within a limited geography range, and the limited geography range being larger than a local geography;
    receive a request for the winning item, a first local item, or a second local item from a user associated with a location of the user, the first local item corresponding with a first item price and the second local item corresponding with a second item price, and the first local item and the second local item being perishable;
    compare the location of the user with the top level market location;
    prevent a display of the winning item for the user when the location of the user is outside the limited geography range;
    prevent the display of the second local item for the user when the second item price is outside the threshold amount;
    provide the first local item to the user, and not the winning item or the second local item, based at least in part the user being outside the limited geography range of the winning item and the second item price being outside the threshold amount of the winning price;
    compare the first item price and the second item price with the winning price to determine a price difference; and
    determine that the price difference is within a threshold amount for the first local item, but not the second local item.

18. The system of claim 17, wherein the processor is configured to execute further computer-executable instructions to:
  provide an indication that a rank of the winning item is above other related items.

19. The system of claim 17, wherein the local fulfillment center is associated with the location of the user by a geographic code that has been assigned to the local fulfillment center based at least in part on a travel time between the local fulfillment center and the location of the user.

20. The system of claim 17, wherein the winning item is nationally-accessible, and wherein the first local item and the second local item are locally-accessible.

21. The computer-implemented method of claim 1, wherein the local geography is limited to a building.

22. The computer-implemented method of claim 1, wherein the threshold amount is 5%.

23. The one or more non-transitory computer-readable storage media of claim 14, wherein the top level market is a state and the local geography is a city within the state.

\* \* \* \* \*